United States Patent [19]

Willenberg et al.

[11] Patent Number: 4,923,660
[45] Date of Patent: May 8, 1990

[54] PROCESS FOR THE PRODUCTION OF MOULDINGS AND FILMS FROM THERMOTROPIC POLYMERS

[76] Inventors: Bernd Willenberg; Aziz El Sayed; Harry Röhr, all of Bayer Aktiengesellschaft, D 5090 Leverkusen, Bayerwerk; Hans-Rudolf Dicke, P.O. Box 166, Bayer Aktiengesellschaft, Krefeld-Uerdingen, all of Fed. Rep. of Germany

[21] Appl. No.: 173,131

[22] Filed: Mar. 25, 1988

Related U.S. Application Data

[63] Continuation of Ser. No. 855,677, Apr. 25, 1986, abandoned.

[30] Foreign Application Priority Data

May 8, 1986 [DE] Fed. Rep. of Germany ....... 3516425

[51] Int. Cl.$^5$ .................. B29B 11/12; B29C 43/02
[52] U.S. Cl. .................. 264/103; 264/319; 264/322; 264/324
[58] Field of Search ............ 264/103, 319, 322, 324, 264/37; 528/191, 193

[56] References Cited

U.S. PATENT DOCUMENTS

| 2,433,727 | 12/1947 | Arnold | 264/322 |
| 3,231,650 | 1/1966 | Findlay et al. | 264/322 |
| 4,284,757 | 8/1981 | Fayolle | 528/191 |

FOREIGN PATENT DOCUMENTS

| 0084456 | 7/1983 | European Pat. Off. . |
| 0116845 | 8/1984 | European Pat. Off. . |
| 0126845 | 12/1984 | European Pat. Off. . |
| 2279875 | 2/1976 | France . |
| 1452654 | 10/1976 | United Kingdom . |

Primary Examiner—Hubert C. Lorin

[57] ABSTRACT

By processing fibres and filaments of thermotropic polymers from anisotropic melt, films and mouldings having predeterminable properties are formed.

10 Claims, No Drawings

PROCESS FOR THE PRODUCTION OF MOULDINGS AND FILMS FROM THERMOTROPIC POLYMERS

This is a continuation of application Ser. No. 855,677, filed Apr. 25, 1986, now abandoned.

The invention relates to the production of mouldings, such as, for example, of sheets, pipes and housing components, and of films possessing outstanding mechanical properties from thermotropic polymers by means of heat and pressure; the invention also relates to the mouldings and films produced by this process.

Substances designated as "thermotropic" are those which form liquid-crystalline melts. Thermotropic polymers are sufficiently well known; see for example, F. E. McFarlane et al., Liquid Crystal Polymers II, Contemporary Topics in Polymer Science, Vol. 2, Plenum Publishing Corporation, 1977;
W. J. Jackson and H. F. Kuhfuss, J. Polymer Science, Polymer Chem. Ed. 14, 2042 (1976);
W. C. Wooten et al. in A. Ciferri "Ultra-high Modulus Polymers", Applied Science Publ., London 1979, page 362 et seq.;
A. Blumstein et al., "Liquid Crystalline Order in Polymers", Academic Press 1978;
J. Preston, Angew. Makromol. Chem. 109/110, page 1-19 (1982);
A. Cifferri, W. R. Krigbaum, R. B. Meyer "Polymer Liquid Crystals", Academic Press, New York, 1982;
P. J. Flory, I. Uematsu, S. P. Papkov, CH. Ober and R. W. Lenz, Advances in Polymer Science 59 (1984); B. Wunderlich, J. Grebowicz, M. G. Dobb, J. McIntyre, H. Finkelmann, G. Rehage, V. P. Shibaev and N. Plate, Advances in Polymer Science 60/61 (1984);
European Patents 1185, 1340, 8855, 11,640, 15,856, 17,310, 18,145, 18,709, 22,344, 44,205 and 49,615;
U.S. Nos. 3,991,013, 3,991,014, 4,066,620, 4,067,852, 4,083,829 and 4,107,143;
WO 79/797, 79/1034, 79/1040.

The liquid-crystalline state of polymer melts can be investigated with the aid of a polarization microscope. For the investigations, the eyepiece was equipped with an attachment which contained a photodiode arranged at the focus of the ocular lens. Using a downstream amplifier with a control device, the measured value at the switched-on microscope was set at 100 scale divisions with parallel Nicol prisms in the absence of a sample of material. A value of 0.01 scale divisions was then obtained with crossed Nicol prisms.

The layer thickness of the polymer melts investigated was 100 μm.

Investigation of the polymer was carried out after the samples had been melted at temperatures between 200° and 400° C. If lightening of the melt observed between the crossed Nicol prisms occurred in this entire range or in a part of it, the polymer was classified as a thermotropic liquid-crystalline substance.

In the measuring arrangement, the liquid-crystalline polymers have values greater than 1 scale division, in general values from 3 to 90 scale divisions. On the other hand, for amorphous melts, for example aromatic polycarbonates, values of less than 0.1 scale division were found.

The method described above is particularly suitable for a rapid determination in the laboratory and gives unambiguous results in virtually all cases. On the other hand, in cases of doubt, it may be reasonable to demonstrate the presence of liquid-crystalline components by means of wide angle X-ray scattering in the melt, as described in, for example, G. W. Gray and P. A. Windsor, "Plastic Crystals, Physico-Chemical Properties and Methods of Investigation", in particular chapter 3, John Wiley & Sons, New York, Sydney, Toronto 1974.

Thermotropic polymers can be processed without difficulties on, for exmple, extruders and injection moulding machines, provided that they possess a sufficiently low softening point.

During this processing, the "liquid-crystalline" segments of the polymer preferentially become oriented in the processing direction. Moreover, processing parameters, such as, for example, processing temperature, screw speed, die design, shear flow and elongational flow, influence the degree of orientation and hence the anisotropy of the mechanical properties. While the mechanical properties in the processing direction are very good, this is not the case transverse to the processing direction. This also applies quantitatively: the higher the degree of orientation, the better are the mechanical propeties in the orientation direction and the poorer are these properties transvere to this direction.

Thus, various problems arose: on the one hand, for example, the degree of orientation is reduced during filling of the mould in injection moulding, so that the injection moulded article does not possess the best possible degree of orientation of the "liquid-crystalline" segments; On the other hand, the fact that the anisotropy could not—if desired—be directly suppressed was a disadvantage.

In order to produce sheets having highly anisotropic properties in a preferred direction, oriented films of thermotropic polymers can be placed one on top of the other and pressed at an elevated temperature so that a unidirectional orientation is obtained in the end product too (DE-OS (German Published Specification) 3,329,341). However, as the number of films used increases, they become more difficult to handle (formation of folds, inclusion of air).

In order to avoid anisotropy in films of thermotropic fully aromatic polyesters, it has been proposed to stretch the films biaxially before the temperature has fallen below the glass transition temperature of polyester (EP-A 24 499). According to another proposal, the anisotropy is partially avoided by a method in which fully stretched layers of thermotropic polymers, for example fully aromatic polyesters, are laid one on top of the other in at least two layers at an angle between 30° and 90°, and compressed under the action of heat (EP-A 72 219). In both processes, the mechanical properrties along the processing direction and transverse to this direction can be brought to a similar level or the same level, which is between those of uniaxially oriented mouldings along the processing direction and transverse to this directon. Consequently, the outstanding properties in the processing direction are partially lost.

It was therefore the object of the invention to provide a method for the production of films and mouldings—preferably mouldings consisting of sheet-like structures—from thermotropic polymers which have outstanding properties in any chosen directions.

Because of the optimum orientation of the "liquid-crystalline" molecular segments, fibres of thermotropic polymers possess extremely good mechanical properties, although to our knowledge they have been employed in practice outside the fibres sector for the production of mouldings of sheet like structures only for producing self-bonded nonwoven sheets, the fibres essentially remaining undeformed and merely being bonded at the cross-over points of the individual fibres (U.S. Pat. No. 4,362,777). This is supposed to avoid melting of the fibres, so that the density of the sheets thus produced is consequently substantially below that of homogeneous, void-free and pore-free mouldings.

Sheet-like structures have also already been produced from fibres of thermotropic polymers and from reinforcing fibres, such as, for example, carbon fibres (U.S. Pat. No. 4 479 999). The mechanical properties such as, for example, tensile strength of the sheet-like structures produced under relatively low pressure are substantially determined by the properties of the reinforcing fibres, whereas it is not evident that the thermotropic polymers have any significant influence on these properties.

The invention relates to a process for the production of films and —preferably sheet-like—mouldings, characterized in that thermotropic fibres or filaments of thermotropic polymers are arranged to give a sheet-like structure, and this is compacted from the anisotropic melt at elevated temperature, if appropriate under pressure.

The diameter of the fibres and filaments to be used can be 1 to 100, preferably 5 to 50, in particular 10 to 30, $\mu$m, and the length can be 1 mm to continuous, preferably 10 mm to continuous and in particular 50 mm to continuous.

The thickness of the films and mouldings to be produced can be 50 $\mu$m to 5 cm, preferably 0.1 mm to 1.5 cm and in particular 2 to 10 mm. The thickness of the sheet-like structures to be compacted depends on its density and on the thickness of the films and mouldings to be produced, and can be determined without difficulty by a few experiments, or calculated by comparison of the densities of sheet-like structures (prior to compacting) and film or moulding (after compacting).

Suitable sheet-like strucures for compacting are woven fabrics, knitted fabrics, nonwovens, and tapes of unidirectionally oriented filaments of fibers. The arrangement is such that it corresponds to the orientation distribution of the properties, such as, for example, the modulus of elasticity, desired in the films or mouldings to be produced:

If, for example, it is desired to produce a film or moulding having the same moduli of elasticity in the longitudinal direction and transverse direction, the fibres or filaments are positioned for compacting in such a way that on average the same number of fibres or filaments are present in the longitudinal direction as in the transverse direction. This can be effected, for example, by placing the same number of parallel fibres or filaments in the longitudinal direction and transverse direction. However, the fibres or filaments are preferably converted to woven fabric, nonwovens or knitted fabric, the orientation distribution of the fibres or the filaments in the sheet-like structure or, where a plurality of sheet-like structures are initially taken, in the sum of the initially taken sheet-like structures, corresponding to the desired orientation distribution of certain properties, such as, for example, the modulus of elasticity.

Where it is desired to produce a film or moulding which is intended to have the same modulus of elasticity in the longitudinal direction and transverse direction, it is possible, for example, to take two unidimensionally oriented fleeces which are rotated by 90° with respect to one another, or a crosslaid fleece oriented uniformly in the longitudinal and transverse directions, or a woven fabric containing the same number of filaments as warp and weft, the moduli of elasticity of warp yarns and weft yarns of course being the same.

If it is desired to produce a film or moulding in which the modulus of elasticity in the transverse direction is twice as high as that in the longitudinal direction, it is possible to compact a sheet-like structure which contains twice as many fibres or filaments, of the same modulus of elasticity, in the transverse direction as in the longitudinal direction, or a sheet-like structure which contains the same number of fibres or filaments in the longitudinal direction and transverse direction, the fibres in the transverse direction, however, having twice as high a modulus of elasticity.

The same applies to films and mouldings having a complicated orientation distribution of the properties. The orientation distribution of the fibres or filaments in the initially taken-sheet like struture should always correspond to the orientation distribution of the desired properties in the films or mouldings to be produced.

For the process according to the invention, sheet-like structures having a high density or high weight per unit area are preferred because they facilitate the pressing operation. Many thermotropic polymers have a density of about 1.40 g/cm$^3$. Accordingly, for the production of films or sheets, a weight per unit area of the sheet-like structure of 140 g/m$^2$ is required per 0.1 mm thickness.

The processing conditions should be chosen so that the anistropic melt does not undergo a transition to the isotropic state. Processing under atmospheric pressure is possible, for example, for the production of films provided that preliminary compacting under pressure has been carried out beforehand. Processing under pressure is preferbly carried out under 1.1 to 1500 bar, in particular under 10 to 300 bar. The processing temperature is as a rule 200 to 400, preferably 250 to 360, in particular 280° to 340° C., but always within the range of the anisotropic melt, the range of existence of which is determined by the optical method described at the outset. Processing under pressure can be carried out batchwise, for example in a press, or continuously, for example in a calender.

The processing conditions should be chosen so that homogeneous, preferably pore-free films and mouldings are formed. In choosing the parameters temperature, pressure and pressing time, care should be taken to ensure that 1. the air present in the sheet-like structure can escape completely so that void-free products are obtained; the density of the products obtained is then the same as the density of the pure thermotropic polymers, and this can be used to check whether void-free products have been formed. The air in a compression mould which can be evacuated can be removed in a simple manner. In a preferred embodiment, the sheet-like structure is subjected, prior to the process according to the invention, to a compacting process at below the melting point of the thermotropic fibres or filaments, so that the voids between the fibres or filaments are substantially eliminated as early as this step, and the danger of inclusion of air during the process according to the invention is further reduced.

2. The processing temperature is chosen sufficiently above the melting point of the thermotropic fibres and filaments so that, under the processing conditions, the melt is shaped to a product free of internal boundaries. Temperatures at which the thermotropic polymers decompose, or which are above the range of existence of the anisotropic melt, are of course avoided; the same applies to temperatures at which the melt, owing to its low viscosity, is pressed out of the mould.

3. The compression pressure is chosen so that, under the processing conditions, the structure of the thermotropic fibres and filaments completely vanishes, so that the thermotropic polymer forms a homogeneous matrix. Thus, for example, thermotropic fibres having a melting point of 210° C. can be compressed at 240° C. under a pressure of 500 bar to give a homogeneous pore-free sheet, whereas a pressure of about 1.2 bar is sufficient for the same material at a compression temperature of 295° C.

4. The processing time is chosen so that, under the processing conditions, a homogeneous product free of internal boundaries is formed. Moreover, the time is longer the thicker the product to be produced, the closer the processing temperature to the melting point, and the lower the chosen compression pressure. Processing times which are as low as possible are desirable in order to keep the thermal load on the polymer small.

The homogeneous, pore-free character of a moulding according to the invention, free of internal surfaces, can be checked preferably by producing a thin section or thin ground section from the moulding and subjecting this section to examination under an optical microscope. In the case of a moulding produced according to the invention, neither the structure of the fibers which were used nor cavities, cracks or gaps must be detectable.

When examined in polarized light between Nicol prisms, a structure must only be visible when layers of different orientation are present, as are established on the basis of the orientation distribution of the sheet-like structure taken for the compacting process; they differ in that they have different birefringences.

In any case, the processing conditions should be chosen so that shear flows and elongational flows in the melt are avoided where these would lead to a substantial degree of disorientation. A substantial degree of disorientation is present when the orientation determined by wide angle X-ray scattering in one or more preferred direction(s) in the product produced according to the invention is more than 10% lower than that in the same direction(s) in the sheet-like structure consisting of fibres and filaments initially taken for compacting. Moreover, the orientation according to a method described by L. E. Alexander, "X-Ray Diffraction Methods in Polymer Science", Wiley Intersciene, New York 1969, is defined as the half-width of the azimuthal intensity distribution.

In other words, if the resulting "orientation" of the sheet-like structure before compacting in preferred directions of interest corresponds approximately to the "orientation" in the same preferred direction of the product produced according to the invention, it is assumed that troublesome shear flows and elongational flows have been avoided. If, according to Example 1, the orientation is 0.044 in the sheet-like structure and 0.043 in the film produced from this, this means that no substantial disorientation has taken place. The embodiment described under 1) above, comprising upstream compacting of the sheet-like structure below the melting point of the thermotropic polymer, is a preferred method for keeping the disorientation low, because the cavities between the fibres of filaments are substantially eliminated before the thermotropic polymer melts. By this procedure, flow processes in the melt which may lead to disorientation can be very substantially avoided.

This preferred embodiment of "preliminary compacting" can be carried out, for example, at 10 to 100, preferably 10° to 50° C., below the melting point of the thermotropic fibres or filaments, under a pressure of 10 to 500 bar, in the course of 10 to 1000 sec. Thereafter, the compression mould can be heated to a temperature of 10 to 100, preferably 20° to 50° C., above the melting point of the thermotropic fibres of filaments while maintaining the pressure, and this temperature is preferably maintained for 10 to 1000 sec., depending on the thickness of the moulding. After cooling beyond the melting point the moulding can then be removed from the mould.

Preliminary compacting and compacting can, however, also be carried out in two separate process steps.

A continuous variant of the particularly preferred combination comprising preliminary compacting below the melting point/compacting above the melting point can be carried out, for example, using a multi-stage calender, preliminary compacting of the initially taken sheet-like structure being carried out between calender rolls at below the melting point of the thermotropic fibres or filaments, and melting according to the invention being effected between calender rolls at above the melting point of the thermotropic fibres or filaments.

Ensuring that surface velocities are exactly identical and that all calender rolls run parallel helps to avoid undesired elongational flows and shear flows. By restricting the nip pressure and temperature, the melt can substantially be prevented from being spread out by squeezing.

Suitable thermotropic polymers which, in the form of fibres or filaments, are suitable for use in the process according to the invention comprise thermotropic polyesters, polyestercarbonates, polyesteramides, polyesterimides, polythiol esters, polyazomethines and thermotropic cellulose derivatives, such as, for example, hydroxypropylcellulose.

The fibres and filaments can be annealed (subsequent solid-phase condensation) before being processed to sheet-like structures, for example according to U.S. No. 4,424,184 or 4,183,895, in order to improve the textile data. The annealing process can, however, also be carried out on the sheet-like structures produced from the fibres or filaments, or can be combined with the process according to the invention.

Thermal after-treatment of the film or moulding already prepared by compacting is also possible.

For the process according to the invention, it is also possible to use sheet-like structures consisting of different fibres or filaments or of mixed fibres or filaments, and, where these include non-thermotropic fibres or filaments, the thermotropic part should be at least 30, preferably at least 50, % by weight, based on the sum of the fibres or filaments.

It is also permissible according to the invention for one fibre or filament component to have a higher melting point than the other fibre or filament component, and it is even possible to carry out the process according to the invention so that only the melting point of the lower-melting component is exceeded. The lower-melting component will always be a thermotropic polymer.

In other words, the melting point of at least one fibre of a thermotropic polymer is always exceeded in the process according to the invention.

Preferred examples of high-melting or non-melting second fibre or filament components include very high-melting thermotropic polymers, lyotropic polymers, such as, for example, aramides, as well as customary reinforcing fibres, such as, for example, carbon fibres, metal fibres, such as steel fibres, aluminium fibres and copper fibres, and glass fibres. Mouldings and films produced according to the invention can also contain fillers, pigments and auxiliaries in customary amounts.

The films and mouldings produced by the process according to the invention possess extraordinary properties, such as a high modulus of elasticity, great toughness and furthermore outstanding dimensional stability. Moreover, the orientation distribution of these properties is determined by the orientation distribution of the fibres in the sheet-like structures initially taken for compacting. Thus, for example, it is possible to produce films having the same modulus of elasticity in the longitudinal direction and transverse direction.

To improve the properties, it is of course also possible to anneal the films and mouldings produced according to the invention.

The films and sheets prepared according to the invention can be converted by customary thermoforming to shaped articles having very good mechanical properties. They are used wherever materials reinforced with long fibres have been employed to date, for example for sheets, pipes, housing components, hulls of boats and skis, but especially for very strong, very rigid, light-weight components, as are required in vehicle construction.

Their advantage over the prior art reinforced materials is seen in the fact that, even in an unreinforced form, they are capable of matching or surpassing the properties of the prior art reinforced materials. The fact that the problems associated with adhesion between reinforcing fibres and resin matrix consequently cannot arise at all, constitutes a considerable technological advantage.

The films and mouldings produced according to the invention with the concomitant use of electrically conductive fibres, for example in the form of laid webs, nonwovens woven fabrics or knitted fabric, are suitable, for example, for very strong, light-weight housing components which act as a shield against electromagnetic radiation.

EXAMPLES

The following substances were introduced into a heatable 25 l V4A stainless steel kettle equipped with a stirrer, a nitrogen inlet and a distillation head:
31.2 mol=4.309 g of p-hydroxybenzoic acid,
14.4 mol=2.392 g of isophthalic acid,
2.4 mol=399 g of terephthalic acid,
14.4 mol=1.586 g of hydroquinone,
2.4 mol=447 g of 4,4'-dihydroxydiphenyl,
76.8 mol=7.841 g of acetic anhydride,
5 g of magnesium acetate and
2 g of gemanium dioxide.

After evacuation had been carried out three times, followed by flushing with nitrogen, the kettle was heated to 170° C. During this procedure, nitrogen was passed over at a flow rate of 20 l/h. After 2.5 hours at 170° C., the temperature was increased to 200° C. in the course of 30 minutes, then to 250° C. in the course of 1.5 hours, and then further to 300° C. in the course of 1.5 hours. 300° C. was initially maintained for about 1 hour under atmospheric pressure, after which the pressure was reduced to 20 mbar in the course of 1.5 hours. The kettle was flushed with nitrogen, and the product was forced out through a valve in the bottom, and granulated.

The polyester obtained possessed an intrinsic viscosity of 0.75 dl/g, measured on a sample of 0.5 g of polyester in 100 ml of p-chlorophenol at 45° C.

An anisotropic melt was observed from above 235° C. to the decomposition temperature. The polyester was spun using a spinning extruder, at a screw temperature and die temperature of 335° C., through a nozzle having 30 holes (hole diameter 0.25 mm, channel length 0.5 mm). The drawing-off speed was 250 m/minute. The filament yarn obtained in this manner had the following properties:
Total linear density: 650 dtex
Tensile strength: 6.7 cN/dtex=938 MPa
Elongation at break: 2.1%
(tensile test according to DIN 53 835)
Initial modulus: 425 cN/dtex=59,540 MPa
Orientation: 0.044

EXAMPLE 1

A V2A stainless steel plate measuring 160×160 mm was wound unidirectionally with a uniformly thick layer of 160 g of the filament yarn described above. The wound plate was subjected to a pressure of 23.4 bar for 20 minutes at 290° C. and to a pressure of 586 bar for 10 minutes at the same temperature. The moulding obtained was cut along the plate edges; two polyester sheets having a thickness of 2.1 mm were obtained. Tensile test bars were taken from these sheets along the original fibre direction, and subjected to a tensile test according to DIN 53 455 and DIN 53 457.

The following properties were obtained in this test:
Tensile strength: 872 MPa
Elongation at break: 0.8%
Tensile modulus of elasticity: 58,950 MPa
Orientation: 0.042

The fibre properties tensile strength and tensile modulus of elasticity could therefore be carried over into the plate to an extent of more than 90%.

EXAMPLE 2

A V2A stainless steel plate measuring 160×160 mm was wound crosswise (angle: 90°) with 160 g of the filament yarn described above, and compressed as described in Example 1. The tensile test bars were taken parallel to each of the two original fibre directions. They had the following properties:

|  | Direction 1 | Direction 2 |
|---|---|---|
| Tensile strength: | 475 MPa | 422 MPa |
| Elongation at break: | 0.8% | 0.9% |
| Tensile modulus of elasticity | 29,400 MPa | 27,250 MPa |

COMPARISON 1

From the thermotropic polyester described at the beginning of the examples, tensile test bars were produced by injection moulding and were tested according to DIN 53,455 and DIN 53,457. The following values were obtained:

Tensile strength: 152 MPa
Elongation at break: 0.7%
Tensile modulus of elasticity: 21,800 MPa

COMPARISON 2

From the thermotropic polyester described at the beginning of the examples, a film having a thickness of 1.9 mm was produced by extrusion through a slot die. The tensile test on test bars taken parallel to the extrusion direction and transverse to this direction gave the following results:

|  | parallel | transverse |
|---|---|---|
| Tensile strength: | 84 MPa | 48 MPa |
| Elongation at break: | 0.38% | 3.0% |
| Tensile modulus of elasticity: | 17,204 MPa | 2,750 MPa |

EXAMPLE 3

A plain-weave fabric was produced from the filament yarn described above. The number of warp yarns the same as the number of weft yarns; the weight per unit area was 200 g/m². 14 layers of this woven fabric were laid crosswise one on top of the other, pre-compacted for 15 minutes at 160° C. under a pressure of 500 bar and then compressed to a 2.0 mm thick sheet in the course of 5 minutes at 260° C./500 bar. The test specimens taken from this sheet in two directions at right angles to one another possessed the following properties:

|  | Direction 1 | Direction 2 |
|---|---|---|
| Tensile strength: | 470 MPa | 465 MPa |
| Elongation at break: | 0.7% | 0.7% |
| Tensile modulus of elasticity: | 31,500 MPa | 32,800 MPa |

EXAMPLES 4–8

A plain-weave fabric having a weight per unit area of 200 g/m² was produced from the filament yarn described above.

The same filament yarn was also cut to a length of 60 mm and then used to produce a crosslaid fleece having a weight per unit area of 150 g/m².

Both in the woven fabric and in the vleece, the number of filaments or fibres in the longitudinal direction and in the transverse direction was the same.

The woven fabric and the nonwoven were compressed under a pressure of 100 bar at the following conditions:

| Example | Sheet-like structure | Number of layers | Temperature [°C.] | Compression time [minutes] |
|---|---|---|---|---|
| 4 | nonwoven | 1 | 280 | 2 |
| 5 | Woven fabric | 1 | 280 | 2 |
| 6 | nonwoven | 2 | 280 | 4 |
| 7 | Woven fabric | 3 | 280 | 5 |
| 8 | Woven fabric | 10 | 290 | 10 |

Test specimens were cut from the resulting films in the longitudinal direction and in the transverse direction, and the following properties were determined for these specimens:

| Example | Thickness [mm] | Tensile strength [MPa] | Elongation at break [%] | Tensile modulus of elasticity [MPa] |
|---|---|---|---|---|
| 4 | 0.1 | 425/485 | 1.3/1.3 | 29,700/30,100 |
| 5 | 0.1 | 455/463 | 1.2/1.4 | 29,100/27,900 |
| 6 | 0.2 | 490/460 | 1.1/1.2 | 28,950/28,500 |
| 7 | 0.4 | 448/460 | 0.9/0.9 | 28,500/28,850 |
| 8 | 1.4 | 465/443 | 0.8/0.7 | 28,000/27,500 |

EXAMPLE 9

The filament yarn described above was heated under a stream of nitrogen and under a pressure of 0.03 bar to 230° C. in the course of one hour and to 250° C. in the course of a further 3 hours, and annealed for 16 hours at 250° C. and for 7 hours at 280° C. Thereafter, the filament yarn (melting point: 275° C.) had the following properties:

Tensile Strength: 18.5 cN/dtex = 2,590 MPa
Elongation at break: 4%
Initial modulus: 390 cN/dtex = 54,600 MPa The annealed filament yarn was further processed analogously to Example 2, and compressed at 350° C. analogously to Example 1. The sheets obtained possessed the following properties:

|  | Direction 1 | Direction 2 |
|---|---|---|
| Tensile strength: | 1,195 MPa | 1,210 MPa |
| Elongation at break: | 0.9% | 1.0% |
| Tensile modulus of elasticity: | 27,500 MPa | 26,900 MPa |

EXAMPLE 10

A fabric was produced analogously to Example 3.

Twelve layers of this fabric were laid one on top of the other and annealed analogously to Example 9 prior to compressing. Thereafter, the material was compressed at 350° C. analogously to Example 1 to give a sheet which possessed the following properties:

|  | Direction 1 | Direction 2 |
|---|---|---|
| Tensile strength: | 1,150 MPa | 1,200 MPa |
| Elongation at break: | 1.1% | 1.3% |
| Tensile modulus of elasticity: | 27,100 MPa | 27,300 MPa |

We claim:

1. A process for the production of films and mouldings from a sheet-like structure of thermotropic polymer fiber or filaments, comprising precompacting the sheet-like structure at a temperature below the melting point of the thermotropic polymer to substantially eliminate cavities between the fibers or filaments within the sheet-like structure, heating said sheet-like structure to obtain an anisotropic melt, followed by compacting and cooling of the sheet-like structure.

2. Process according to claim 1 wherein the heating of said structure is carried out under a pressure of from 1.1 to 1,500 bar.

3. Process according to claim 1, wherein the fibers or filaments are arranged undirectionally to give a sheet-like structure.

4. Process according to claim 1, characterized in the fibers or filaments are arranged crosswise at an angle of 90° to give a sheet-like structure.

5. Process according to claim 1, wherein the fibers or filaments in a plane are at an angle of 30° to 90°.

6. Process according to claim 1, wherein the fibers or filaments in an area are laid in random directions.

7. Process according to claim 1, wherein the fibers or filaments are used in the form of tapes, woven fabrics and nonwovens.

8. Process according to claim 1, wherein the fibers or filaments are used in the form of knitted fabrics.

9. Process according to claim 1 wherein up to 50% by weight of the fibers of filaments employed are of a material selected from the group consisting of non-thermotropic thermoplastics, glass, aramide, carbon and metal.

10. The process of claim 1 wherein said precompacting is carried out at a temperature between 10° and 100° C. below the melting temperature of the thermotropic polymer at a pressure between 10 and 500 bar.

* * * * *